US012217656B2

(12) United States Patent
Hu

(10) Patent No.: US 12,217,656 B2
(45) Date of Patent: Feb. 4, 2025

(54) DISPLAY PANEL

(71) Applicant: TCL CHINA STAR OPTOELECTRONICS TECHNOLOGY CO., LTD., Guangdong (CN)

(72) Inventor: Daobing Hu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,224

(22) PCT Filed: Jun. 13, 2022

(86) PCT No.: PCT/CN2022/098382
§ 371 (c)(1),
(2) Date: Nov. 30, 2023

(87) PCT Pub. No.: WO2023/226101
PCT Pub. Date: Nov. 30, 2023

(65) Prior Publication Data

US 2024/0221604 A1 Jul. 4, 2024

(30) Foreign Application Priority Data

May 24, 2022 (CN) ......................... 202210571407.4

(51) Int. Cl.
*G09G 3/32* (2016.01)

(52) U.S. Cl.
CPC ......... *G09G 3/32* (2013.01); *G09G 2300/026* (2013.01)

(58) Field of Classification Search
CPC .. G09G 3/32; G09G 2300/026; G09F 9/3026; G09F 9/33
See application file for complete search history.

(56) References Cited

U.S. PATENT DOCUMENTS 11,852,851 B2 * 12/2023 Wang ................... G09G 3/3426
11,880,096 B1 * 1/2024 Sun ........................... G09F 9/33
(Continued)

FOREIGN PATENT DOCUMENTS

CN 105509009 A 4/2016
CN 108983469 A 12/2018
(Continued)

OTHER PUBLICATIONS

International Search Report in International application No. PCT/CN2022/098382, mailed on Dec. 19, 2022.
(Continued)

*Primary Examiner* — William Lu
(74) *Attorney, Agent, or Firm* — PV IP PC; Wei Te Chung

(57) ABSTRACT

Disclosed is a display panel, which adopts two display screens arranged by splicing. The display screen includes a display area and a non-display area on at least one side of the display area. An LED substrate is disposed on the non-display area. The LED substrate includes a substrate and a light emitting device disposed on the substrate. A cover plate is provided on at least two display screens. A groove is provided on one side of the cover plate close to the LED substrate. A side surface of the substrate is disposed opposite to a groove wall of the groove. A part of the groove wall surface corresponding to the side surface of the substrate is a reflection interface.

16 Claims, 4 Drawing Sheets

(56) References Cited

U.S. PATENT DOCUMENTS

| | | | | |
|---|---|---|---|---|
| 11,988,930 | B2 * | 5/2024 | Zhang | G06F 1/1641 |
| 2011/0128208 | A1 * | 6/2011 | Choi | H01J 11/34<br>345/60 |
| 2013/0229798 | A1 * | 9/2013 | Shimakawa | G02B 6/0068<br>362/235 |
| 2013/0286059 | A1 * | 10/2013 | Saishu | G09G 3/32<br>345/698 |
| 2014/0198251 | A1 * | 7/2014 | Li | H04N 9/643<br>348/453 |
| 2016/0198578 | A1 * | 7/2016 | Du | G09F 9/30<br>361/679.01 |
| 2016/0266862 | A1 * | 9/2016 | Ding | G06F 3/1446 |
| 2016/0267860 | A1 * | 9/2016 | Liu | G09G 3/32 |
| 2017/0131584 | A1 * | 5/2017 | Liu | G02F 1/133526 |
| 2017/0249119 | A1 * | 8/2017 | Ding | G09F 9/33 |
| 2018/0018931 | A1 * | 1/2018 | Zhang | G09G 5/397 |
| 2018/0088888 | A1 * | 3/2018 | Ma | G06F 3/147 |
| 2018/0173036 | A1 * | 6/2018 | Kim | G02F 1/133524 |
| 2018/0247609 | A1 * | 8/2018 | Joshi | G09G 3/3426 |
| 2018/0267767 | A1 * | 9/2018 | Lee | G06F 3/1446 |
| 2019/0067397 | A1 * | 2/2019 | Cho | H10K 59/122 |
| 2020/0111391 | A1 * | 4/2020 | Chao | H01L 25/0753 |
| 2020/0111771 | A1 * | 4/2020 | Su | H01L 25/167 |
| 2020/0211155 | A1 * | 7/2020 | Ma | G06T 3/403 |
| 2020/0264346 | A1 * | 8/2020 | Wang | G02B 19/0066 |
| 2022/0017786 | A1 * | 1/2022 | Wang | C09J 7/255 |
| 2022/0036776 | A1 * | 2/2022 | Chao | H01L 27/156 |
| 2022/0058994 | A1 * | 2/2022 | Tseng | G09F 9/33 |
| 2022/0244605 | A1 * | 8/2022 | Zhang | G09F 9/3026 |
| 2024/0019727 | A1 * | 1/2024 | Zheng | G02F 1/13336 |

FOREIGN PATENT DOCUMENTS

| | | | |
|---|---|---|---|
| CN | 111369900 | A | 7/2020 |
| CN | 112908188 | A | 6/2021 |
| CN | 113270049 | A | 8/2021 |
| CN | 113990211 | A | 1/2022 |
| CN | 114038340 | A | 2/2022 |
| CN | 215730616 | U | 2/2022 |
| CN | 114241937 | A | 3/2022 |
| CN | 114242874 | A | 3/2022 |
| IN | 112863390 | A | 5/2021 |

OTHER PUBLICATIONS

Written Opinion of the International Search Authority in International application No. PCT/CN2022/098382,mailed on Dec. 19, 2022.

Chinese Office Action issued in corresponding Chinese Patent Application No. 202210571407.4 dated Jan. 9, 2023, pp. 1-9.

* cited by examiner

DISPLAY PANEL

FIELD OF THE DISCLOSURE

The present application relates to the technical field of display technologies, and more particularly, to a display panel.

BACKGROUND

With the rapid development of the outdoor display market, large size and high resolution have become the development direction of outdoor display. The conventional splicing screen cannot eliminate seams, which affects a visual performance. Therefore, solving the seam issue of splicing screens has become a key breakthrough point that needs to be solved urgently.

SUMMARY

The embodiments of the present application provide a display panel, which can visually eliminate seams of the display panel and side-view black borders at the seams.

Embodiments of the present application provide a display panel, including:

at least two display screens, wherein the at least two display screens are spliced, and each of the at least two display screens comprises a display area and a non-display area located on at least one side of the display area;

light emitting diode (LED) substrates, wherein the LED substrates are disposed on the non-display area, and each of the LED substrates comprises a substrate and a light emitting device disposed on the substrate; and a cover plate, wherein the cover plate is disposed on the at least two display screens, a groove is formed on a side of the cover plate close to each of the LED substrates, and each of the LED substrate is disposed in the groove;

wherein a side surface of the substrate is disposed opposite to a groove wall of the groove, and a part of a groove wall surface corresponding to the side surface of the substrate is a reflection interface.

Optionally, in some embodiments of the present application, the reflection interface is a smooth groove wall surface.

Optionally, in some embodiments of the present application, there is a medium between the groove wall surface and each of the LED substrates, a refractive index of the cover plate is greater than a refractive index of the medium, and the groove wall surface and the medium form the reflection interface.

Optionally, in some embodiments of the present application, the medium comprises air or a transparent solid material.

Optionally, in some embodiments of the present application, in two adjacent display screens, there is a gap between the two display screens, and each of the LED substrates is disposed on the two adjacent display screens and blocks the gap.

Optionally, in some embodiments of the present application, at the splicing of two adjacent display screens, one of the LED substrates is correspondingly disposed on the non-display area of one of the display screens.

Optionally, in some embodiments of the present application, the groove and the gap are arranged overlappingly.

Optionally, in some embodiments of the present application, the groove comprises a first sub-groove and a second sub-groove, the first sub-groove overlaps with one of the LED substrates, and the second sub-groove overlaps with another of the LED substrates.

Optionally, in some embodiments of the present application, the transparent solid material fills the gap.

Optionally, in some embodiments of the present application, a resolution of each of the LED substrates is same as a resolution of each of the at least two display screens.

Embodiments of the present application also provide a display panel, which includes:

at least two display screens, wherein the at least two display screens are spliced, and each of the at least two display screens comprises a display area and a non-display area located on at least one side of the display area;

light emitting diode (LED) substrates, wherein the LED substrates are disposed on the non-display area, and each of the LED substrates comprises a substrate and a light emitting device disposed on the substrate; and a cover plate, wherein the cover plate is disposed on the at least two display screens, a groove is formed on a side of the cover plate close to each of the LED substrates, and each of the LED substrate is disposed in the groove;

wherein a side surface of the substrate is disposed opposite to a groove wall of the groove, and a part of a groove wall surface corresponding to the side surface of the substrate is a reflection interface;

wherein a resolution of each of the LED substrates is same as a resolution of each of the at least two display screens;

wherein the reflection interface is a smooth groove wall surface.

Optionally, in some embodiments of the present application, there is a medium between the groove wall surface and each of the LED substrates, a refractive index of the cover plate is greater than a refractive index of the medium, and the groove wall surface and the medium form the reflection interface.

Optionally, in some embodiments of the present application, the medium comprises air or a transparent solid material.

Optionally, in some embodiments of the present application, in two adjacent display screens, there is a gap between the two display screens, and each of the LED substrates is disposed on the two adjacent display screens and blocks the gap.

Optionally, in some embodiments of the present application, at the splicing of two adjacent display screens, one of the LED substrates is correspondingly disposed on the non-display area of one of the display screens.

Optionally, in some embodiments of the present application, the groove and the gap are arranged overlappingly.

Optionally, in some embodiments of the present application, the groove comprises a first sub-groove and a second sub-groove, the first sub-groove overlaps with one of the LED substrates, and the second sub-groove overlaps with another of the LED substrates.

Optionally, in some embodiments of the present application, the transparent solid material fills the gap.

Optionally, in some embodiments of the present application, the light emitting device comprises a sub-millimeter light emitting diode or a micrometer light emitting diode.

Optionally, in some embodiments of the present application, each of the at least two display screens comprises a liquid crystal display screen or an LED direct-display display screen.

The embodiments of the present application adopt two display screens arranged by splicing. The display screen includes a display area and a non-display area on at least one side of the display area. The LED substrate is arranged on the non-display area. The LED substrate includes a substrate and a light emitting device disposed on the substrate. The cover plate is provided on at least two display screens. The side of the cover plate close to the LED substrate is provided with a groove, and the LED substrate is arranged in the groove. The side surface of the substrate is arranged opposite to the groove wall of the groove. A part of the groove wall surface corresponding to the side surface of the substrate is a reflection interface. This can visually eliminate seams between the display screens and can also visually eliminate side-view black borders at the seams.

BRIEF DESCRIPTION OF THE DRAWINGS

In order to illustrate the technical solutions in the embodiments of the present application more clearly, the following briefly introduces the accompanying drawings that need to be used in the description of the embodiments. Obviously, the drawings in the following description are only some embodiments of the present application. For those skilled in the art, other drawings can also be obtained from these drawings without creative effort.

Figure 1:
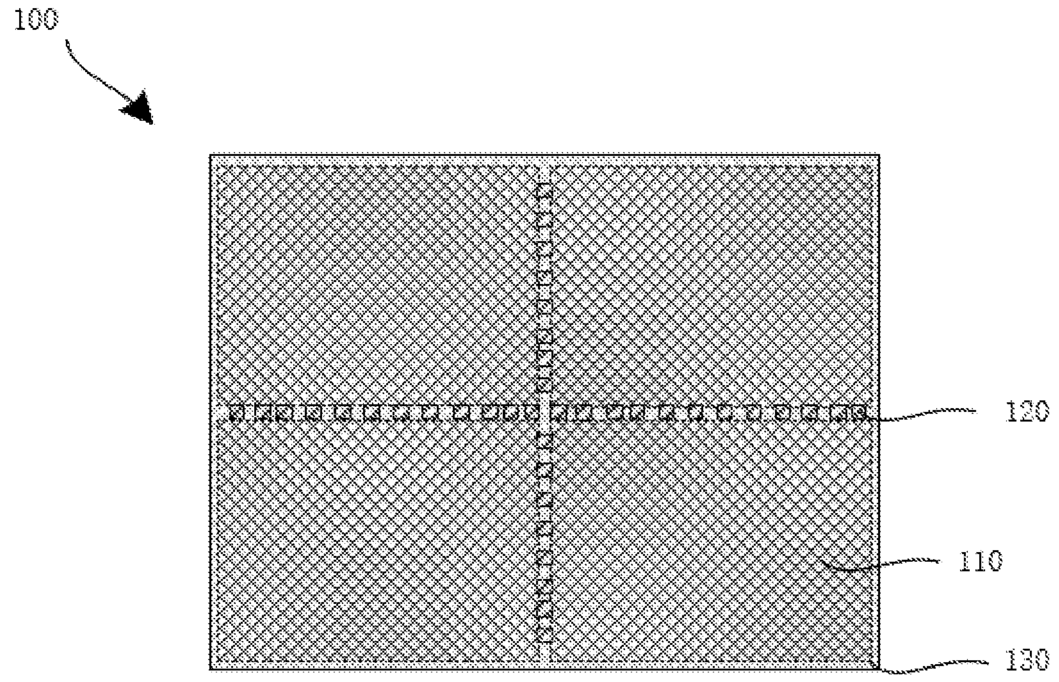
FIG. 1 is a schematic top-view structural diagram of a display panel according to Embodiment 1 of the present application.

Description of reference numerals: display panel 100, display screen 110, LED substrate 120, cover plate 130, display area AA, non-display area NA, substrate 121, light emitting device 122, groove 131, first sub-groove 131*b*, second sub-groove 131*c*, groove walls 131*a*, reflection interface 132*a*, array substrate 111, liquid crystal layer 112, color filter substrate 113, light emitting element 114, medium 140, transparent solid material 141, and gap 150.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application. In addition, it should be understood that the specific embodiments described herein are only used to illustrate and explain the present application, but not to limit the present application. In this application, unless otherwise stated, the directional words used such as "upper" and "lower" generally refer to the upper and lower sides of the device in actual use or working state, specifically the drawing direction in the accompanying drawings, and "inside" and "outside" refer to the outline of the device.

Embodiments of the present application provide a display panel, which will be described in detail below. It should be noted that the description order of the following embodiments is not intended to limit the preferred order of the embodiments.

Embodiment 1

Figure 2:
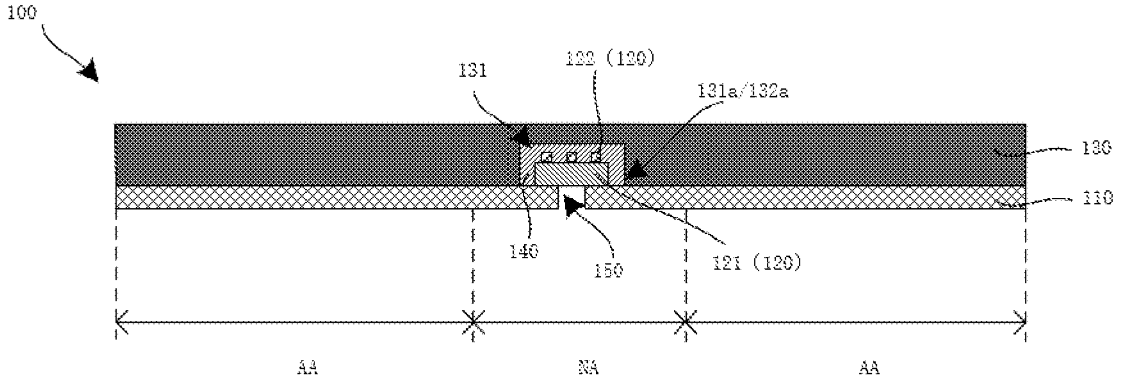
FIG. 2 is a schematic cross-sectional structural diagram of a display panel according to Embodiment 1 of the present application.

Please combine FIG. 1, FIG. 2, FIG. 3, FIG. 4, and FIG. 5. Referring to FIG. 1, the present embodiment provides a display panel 100 including: at least two display screens 110, LED substrates 120, and a cover plate 130. Referring to FIG. 2, at least two display screens 110 are spliced together, and the display screen 110 includes a display area AA and a non-display area NA located on at least one side of the display area AA. The LED substrate 120 is disposed on the non-display area NA. The LED substrate 120 includes a substrate 121 and a light emitting device 122 disposed on the substrate 121. A cover plate 130 is disposed on at least two display screens 110. A groove 131 is provided on the side of the cover plate 130 close to the LED substrate 120, and the LED substrate 120 is disposed in the groove 131. The side surface of the substrate 121 is disposed opposite to the groove wall of the groove 131, and a part of a groove wall surface 131*a* corresponding to the side surface of the substrate 121 is a reflection interface 132*a*.

Figure 3:
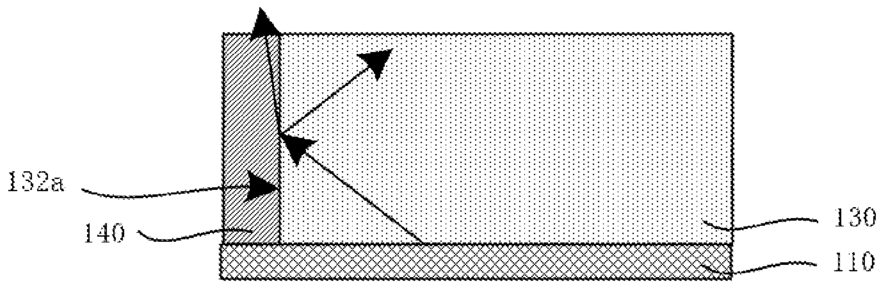
FIG. 3 is a schematic diagram of an optical path between a cover plate and a medium provided in the present application.

Referring to FIG. 2 and FIG. 3, it can be understood that the purpose of compensating light at seams can be achieved by arranging the LED substrate 120 in the non-display area NA, thereby eliminating the seams in front view. However, because the substrate 121 of the LED does not emit light, a black border may be seen on the edge of the substrate 121 when viewed from the side, which affects the display performance. By arranging the cover plate 130, the groove 131 is provided on the side of the cover plate 130 close to the LED substrate 120. The LED substrate 120 is disposed in the groove 131, and the side surface of the substrate 121 is disposed opposite to the groove wall of the groove 131. A part of the groove wall surface 131*a* corresponding to the side surface of the substrate 121 forms a reflection interface 132*a*. The reflective interface 132*a* may reflect light emitted from the display screen 110. It can visually eliminate the side-view black border to achieve the purpose of improving the display taste. In addition, the cover plate 130 covers the LED substrate 120 and the display screen 110, so that a light emitting surface of the LED substrate 120 and a light emitting surface of the display screen 110 are consistent, to further enhance the display taste. The light emitting device 122 may be a sub-millimeter light emitting diode or a micrometer light emitting diode.

Figure 4:
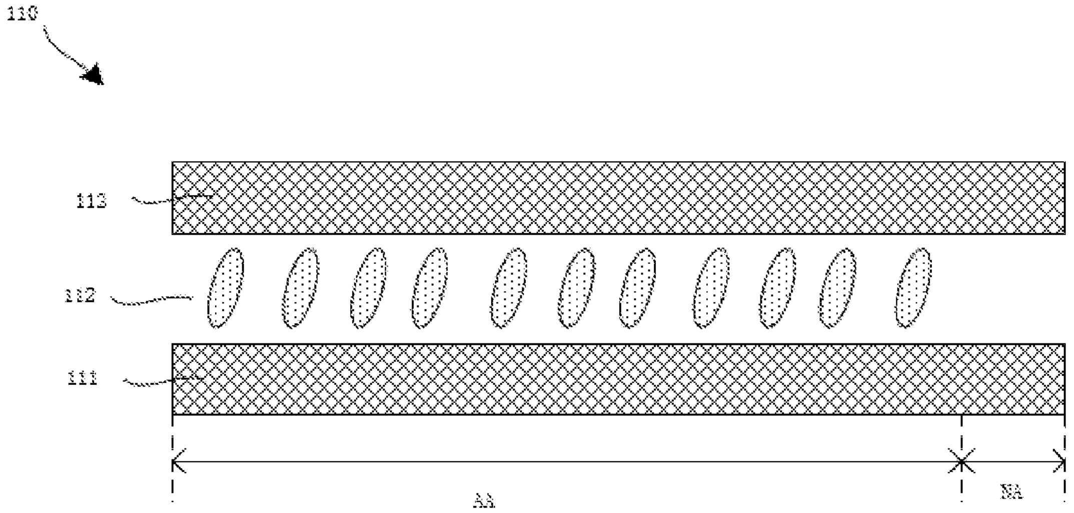
FIG. 4 is a schematic structural diagram of a liquid crystal display screen provided by the present application.
Figure 5:
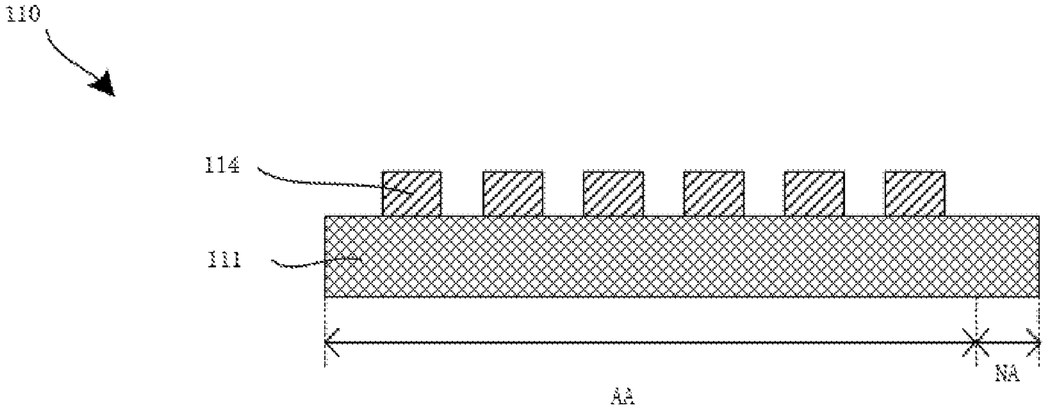
FIG. 5 is a schematic structural diagram of a LED direct-display display screen provided by the present application.

Referring to FIG. 4 and FIG. 5, it should be noted that the display screen 110 includes a liquid crystal display screen or an LED direct-display display screen. Referring to FIG. 4, the liquid crystal display screen includes an array substrate 111, a liquid crystal layer 112, and a color filter substrate 113. The array substrate 111 and the color filter substrate 113 are disposed opposite to each other. The liquid crystal layer 112 is disposed between the array substrate 111 and the color filter substrate 113. Referring to FIG. 5, the LED direct-display display screen includes an array substrate 111 and a light emitting element 114. The light emitting element 114 is provided on the array substrate 111. It should be noted that the light emitting element 114 may be a sub-millimeter light emitting diode or a micron light emitting diode.

In this embodiment, the reflection interface 132*a* is a smooth groove wall surface 131*a*.

It can be understood that the smooth reflection interface 132*a* can improve the reflection effect of the reflection interface 132*a*. It can be understood that, after grinding or polishing, the groove wall surface 131*a* can form a smooth reflective interface. It should be noted that, in some embodiments, the entire surface of the groove wall 131*a* can be ground and polished to form the reflection interface 132*a*, more light will be emitted from the reflection interface 132*a*, and the cover plate 130 can be better lifted to eliminate the effect of black borders in the side view.

In this embodiment, there is a medium 140 between the groove wall 131*a* and the LED substrate 120, the refractive index of the cover plate 130 is greater than that of the medium 140, and the groove wall 131*a* and the medium 140 form a reflection interface 132*a*.

Referring to FIG. 3, it can be understood that when light passes through the media 140 with different refractive indices, refraction and reflection will occur at the interface between the two mediums 140. The refractive index of the cover plate 130 is different from that of the medium 140, and the groove wall surface 131*a* of the cover plate 130 and the medium 140 form a reflection interface 132*a*. The reflective interface 132*a* reflects the light from the display panel 100 to the outside, and visually eliminates the side-view black bars at the substrate 121. It can be understood that, when the refractive index of the cover plate 130 is greater than that of the medium 140, the refraction angle increases, and more light rays will be emitted to the outside, thereby improving the light output effect.

In this embodiment, the medium 140 includes air or a transparent solid material 141.

It can be understood that when air is used as the medium 140, the manufacturing process of the display panel 100 can be simplified, and the production cost of the display panel 100 can be reduced. Compared with other mediums 140, air as the medium 140 can also reduce light loss. When the transparent solid material 141 is used as the medium 140, a sealing property of the display panel 100 can be improved. The transparent solid material 141 includes silica gel, optical glue, or epoxy resin.

In this embodiment, in two adjacent display screens 110, there is a gap 150 between the two display screens 110. One LED substrate 120 is disposed on two adjacent display screens 110 and blocks the gap 150.

It can be understood that the LED substrate 120 is disposed on two adjacent display screens 110 and cover the gap 150. The gap 150 can be compensated by using the light emitted by the LED substrate 120 to eliminate the gap 150 visually. In addition, the LED substrate 120 can also be positioned at the center of the adjacent display panels 100. As the compensation light source, the LED substrate 120 can evenly radiate the non-display area NA of the display panel 100 to improve the display performance of the display panel 100.

In this embodiment, the grooves 131 and the gaps 150 are arranged to overlap.

It can be understood that the overlapping arrangement of the grooves 131 and the gaps 150 can enable the grooves 131 to better accommodate the LED substrate 120 and facilitate the formation of a reflective interface 132*a* between the LED substrate 120 and the groove wall surface 131*a*.

In this embodiment, the transparent solid material 141 fills the gap 150.

Figure 6:
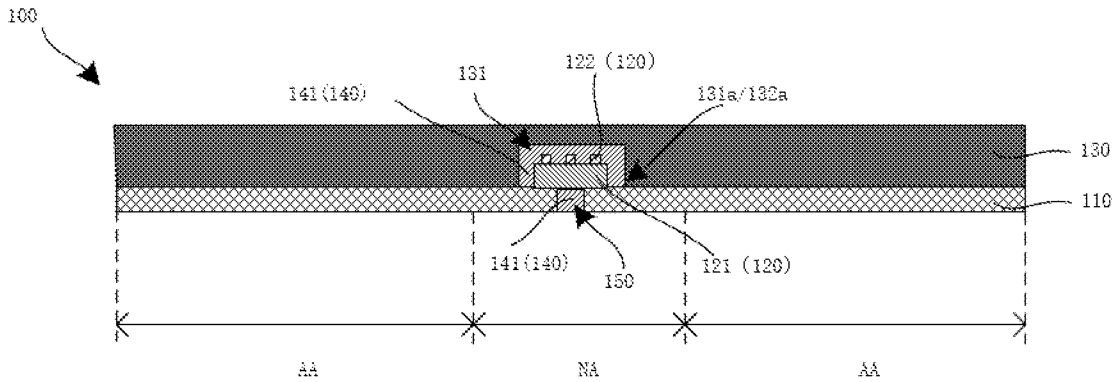
FIG. 6 is a schematic structural diagram of a display panel when a medium provided in Embodiment 1 of the present application is a transparent solid material.

Referring to FIG. 6, it can be understood that filling the gap 150 with the transparent solid material 141 can improve the sealing performance of the display panel 100.

In this embodiment, the resolution of the LED substrate 120 is the same as the resolution of the display screen 110.

It can be understood that, setting the resolution of the LED substrate 120 to be the same as the resolution of the display panel 100 can make the light captured by the human eye be the same as the light of the display panel 100. After the light passes through the cover plate 130, the LED substrate 120 and the light emitting surface of the display panel 100 are kept consistent, so as to improve the display performance of the display panel 100.

Embodiment 2

Figure 7:
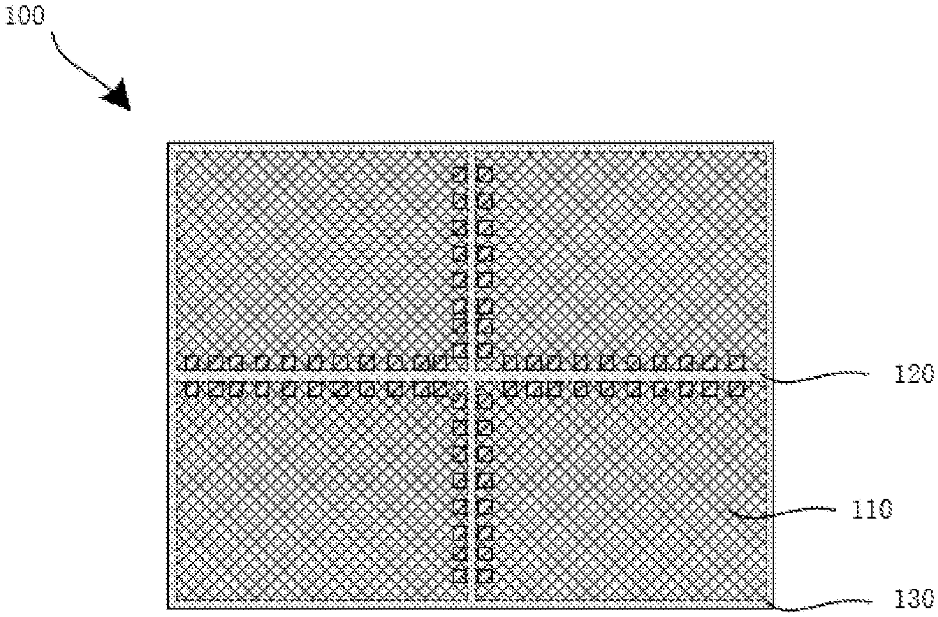
FIG. 7 is a schematic top-view structural diagram of a display panel according to Embodiment 2 of the present application.
Figure 8:
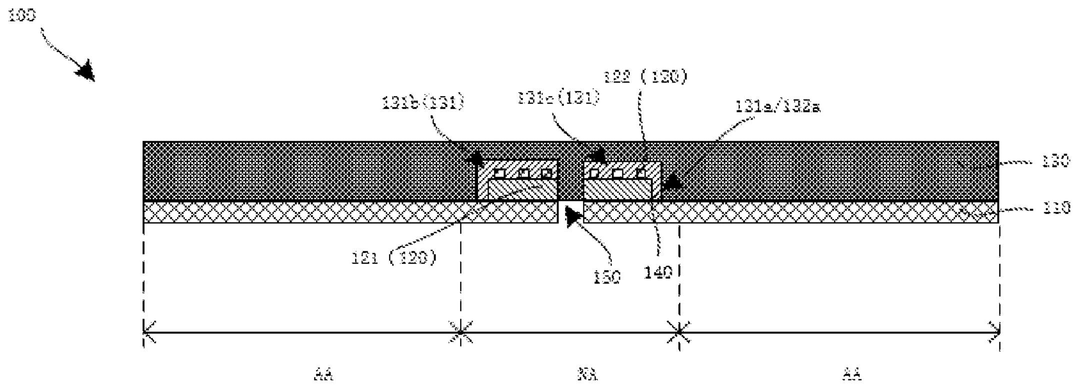
FIG. 8 is a schematic cross-sectional structural diagram of a display panel according to Embodiment 2 of the present application.

Please combine FIG. 7, and FIG. 8. Referring to FIG. 7, the present embodiment provides a display panel 100 including: at least two display screens 110, LED substrates 120, and a cover plate 130. Referring to FIG. 8, at least two display screens 110 are spliced together, and the display screen 110 includes a display area AA and a non-display area NA located on at least one side of the display area AA. The LED substrate 120 is disposed on the non-display area NA. The LED substrate 120 includes a substrate 121 and a light emitting device 122 disposed on the substrate 121. A cover plate 130 is disposed on at least two display screens 110. A groove 131 is provided on the side of the cover plate 130 close to the LED substrate 120, and the LED substrate 120 is disposed in the groove 131. The side surface of the substrate 121 is disposed opposite to the groove wall of the groove 131, and a part of a groove wall surface 131*a* corresponding to the side surface of the substrate 121 is a reflection interface 132*a*.

Referring to FIG. 3 and FIG. 7, it can be understood that the purpose of compensating light at seams can be achieved by arranging the LED substrate 120 in the non-display area NA, thereby eliminating the seams in front view. However, because the substrate 121 of the LED does not emit light, a black border may be seen on the edge of the substrate 121 when viewed from the side, which affects the display performance. By arranging the cover plate 130, the groove 131 is provided on the side of the cover plate 130 close to the LED substrate 120. The LED substrate 120 is disposed in the groove 131, and the side surface of the substrate 121 is disposed opposite to the groove wall of the groove 131. A part of the groove wall surface 131*a* corresponding to the side surface of the substrate 121 forms a reflection interface 132*a*. The reflective interface 132*a* may reflect light emitted from the display screen 110. It can visually eliminate the side-view black border to achieve the purpose of improving the display taste. In addition, the cover plate 130 covers the LED substrate 120 and the display screen 110, so that a light emitting surface of the LED substrate 120 and a light emitting surface of the display screen 110 are consistent, to further enhance the display taste. The light emitting device 122 may be a sub-millimeter light emitting diode or a micrometer light emitting diode.

Referring to FIG. 4 and FIG. 5, it should be noted that the display screen 110 includes a liquid crystal display screen or an LED direct-display display screen. Referring to FIG. 4, the liquid crystal display screen includes an array substrate 111, a liquid crystal layer 112, and a color filter substrate 113. The array substrate 111 and the color filter substrate 113 are disposed opposite to each other. The liquid crystal layer 112 is disposed between the array substrate 111 and the color filter substrate 113. Referring to FIG. 5, the LED direct-display display screen includes an array substrate 111 and a light emitting element 114. The light emitting element 114 is provided on the array substrate 111. It should be noted that the light emitting element 114 may be a sub-millimeter light emitting diode or a micron light emitting diode.

In this embodiment, the reflection interface 132*a* is a smooth groove wall surface 131*a*.

Referring to FIG. 3, it can be understood that the smooth reflection interface 132*a* can improve the reflection effect of the reflection interface 132*a*. It can be understood that, after grinding or polishing, the groove wall surface 131*a* can form a smooth reflective interface. It should be noted that, in some embodiments, the entire surface of the groove wall 131*a* can be ground and polished to form the reflection interface 132*a*, more light will be emitted from the reflection interface 132*a*, and the cover plate 130 can be better lifted to eliminate the effect of black borders in the side view.

In this embodiment, there is a medium 140 between the groove wall 131*a* and the LED substrate 120, the refractive index of the cover plate 130 is greater than that of the medium 140, and the groove wall 131*a* and the medium 140 form a reflection interface 132*a*.

Referring to FIG. 3, it can be understood that when light passes through the media 140 with different refractive indices, refraction and reflection will occur at the interface between the two mediums 140. The refractive index of the cover plate 130 is different from that of the medium 140, and the groove wall surface 131*a* of the cover plate 130 and the medium 140 form a reflection interface 132*a*. The reflective interface 132*a* reflects the light from the display panel 100 to the outside, and visually eliminates the side-view black bars at the substrate 121. It can be understood that, when the refractive index of the cover plate 130 is greater than that of the medium 140, the refraction angle increases, and more light rays will be emitted to the outside, thereby improving the light output effect.

In this embodiment, the medium 140 includes air or a transparent solid material 141.

Figure 9:
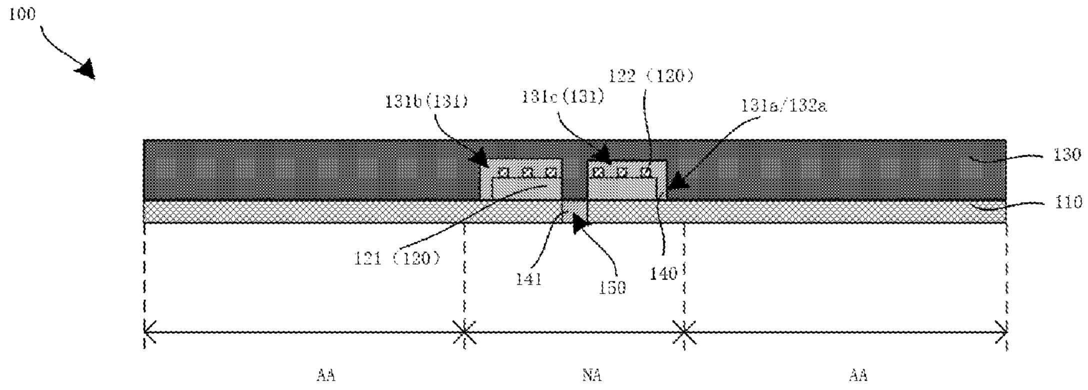
FIG. 9 is a schematic structural diagram of a display panel when a medium provided in Embodiment 2 of the present application is a transparent solid material.

It can be understood that when air is used as the medium 140, the manufacturing process of the display panel 100 can be simplified, and the production cost of the display panel 100 can be reduced. Compared with other mediums 140, air as the medium 140 can also reduce light loss. Referring to FIG. 9, when the transparent solid material 141 is used as the medium 140, a sealing property of the display panel 100 can be improved. The transparent solid material 141 includes silica gel, optical glue, or epoxy resin.

In this embodiment, in two adjacent display screens 110, there is a gap 150 between the two display screens 110. One LED substrate 120 is disposed on two adjacent display screens 110 and blocks the gap 150.

It can be understood that one LED substrate 120 correspondingly disposed on the non-display area NA of one display screen 110 can make the LED substrate 120 and the display screen 110 form a minimum splicing unit, which facilitates the splicing process of the display panel 100.

In this embodiment, the groove 131 includes a first sub-groove 131*b* and a second sub-groove 131*c*. The first sub-groove 131*b* is disposed to overlap with one LED substrate 120, and the second sub-groove 131*c* is disposed to overlap with another LED substrate 120.

Referring to FIG. 9, it can be understood that the first sub-groove 131*b* is disposed to overlap with one LED substrate 120. The second sub-groove 131*c* is disposed to overlap with another LED substrate 120. The overlapping arrangement of the groove 131 and the gap 150 enables the groove 131 to better accommodate the LED substrate 120, so that the LED substrate 120 and the groove wall surface 131*a* can form a reflective interface 132*a*.

In this embodiment, the transparent solid material 141 fills the gap 150.

It can be understood that, filling the gap 150 with the transparent solid material 141 can improve the sealing performance of the display panel 100.

In this embodiment, the resolution of the LED substrate 120 is the same as the resolution of the display screen 110.

It can be understood that, setting the resolution of the LED substrate 120 to be the same as the resolution of the display panel 100 can make the light captured by the human eye be the same as the light of the display panel 100. After the light passes through the cover plate 130, the LED substrate 120 and the light emitting surface of the display panel 100 are kept consistent, so as to improve the display performance of the display panel 100.

The display panel provided by the embodiments of the present application has been described in detail above. Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on the present application.

What is claimed is:

1. A display panel, comprising:

at least two display screens, wherein the at least two display screens are spliced, and each of the at least two display screens comprises a display area and a non-display area located on at least one side of the display area;

light emitting diode (LED) substrates, wherein the LED substrates are disposed on the non-display area, and each of the LED substrates comprises a substrate and a light emitting device disposed on the substrate; and a cover plate, wherein the cover plate is disposed on the at least two display screens, a groove is formed on a side of the cover plate close to each of the LED substrates, and each of the LED substrates is disposed in the groove;

wherein a side surface of the substrate is disposed opposite to a groove wall of the groove, and a part of a groove wall surface corresponding to the side surface of the substrate is a reflection interface;

wherein at a splicing portion between adjacent two of the display screens, two of the LED substrates correspond to and are disposed on the non-display areas of the adjacent two of the display screens respectively;

wherein the groove comprises a first sub-groove and a second sub-groove that are spaced from each other, the first sub-groove receives one of the LED substrates corresponding to the non-display areas of the adjacent two of the display screens, and the second sub-groove receives the other of the LED substrates corresponding to the non-display areas of the adjacent two of the display screens.

2. The display panel of claim 1, wherein the reflection interface is a smooth groove wall surface.

3. The display panel of claim 1, wherein there is a medium between the groove wall surface and each of the LED substrates, a refractive index of the cover plate is greater than a refractive index of the medium, and the groove wall surface and the medium form the reflection interface.

4. The display panel of claim 3, wherein the medium comprises air or a transparent solid material.

5. The display panel of claim 4, wherein in two adjacent display screens, there is a gap between the two display screens, and each of the LED substrates is disposed on the two adjacent display screens and blocks the gap.

6. The display panel of claim 5, wherein the groove and the gap are arranged overlappingly.

7. The display panel of claim 5, wherein the transparent solid material fills the gap.

8. The display panel of claim 1, wherein a resolution of each of the LED substrates is same as a resolution of each of the at least two display screens.

9. A display panel, comprising:

at least two display screens, wherein the at least two display screens are spliced, and each of the at least two display screens comprises a display area and a non-display area located on at least one side of the display area;

light emitting diode (LED) substrates, wherein the LED substrates are disposed on the non-display area, and each of the LED substrates comprises a substrate and a light emitting device disposed on the substrate; and a cover plate, wherein the cover plate is disposed on the at least two display screens, a groove is formed on a side of the cover plate close to each of the LED substrates, and each of the LED substrates is disposed in the groove;

wherein a side surface of the substrate is disposed opposite to a groove wall of the groove, and a part of a groove wall surface corresponding to the side surface of the substrate is a reflection interface;

wherein a resolution of each of the LED substrates is same as a resolution of each of the at least two display screens;

wherein the reflection interface is a smooth groove wall surface;

wherein at a splicing portion between adjacent two of the display screens, two of the LED substrates correspond to and are disposed on the non-display areas of the adjacent two of the display screens respectively;

wherein the groove comprises a first sub-groove and a second sub-groove that are spaced from each other, the first sub-groove receives one of the LED substrates corresponding to the non-display areas of the adjacent two of the display screens, and the second sub-groove receives the other of the LED substrates corresponding to the non-display areas of the adjacent two of the display screens.

10. The display panel of claim 9, wherein there is a medium between the groove wall surface and each of the LED substrates, a refractive index of the cover plate is greater than a refractive index of the medium, and the groove wall surface and the medium form the reflection interface.

11. The display panel of claim 10, wherein the medium comprises air or a transparent solid material.

12. The display panel of claim 11, wherein in two adjacent display screens, there is a gap between the two display screens, and each of the LED substrates is disposed on the two adjacent display screens and blocks the gap.

13. The display panel of claim 12, wherein the groove and the gap are arranged overlappingly.

14. The display panel of claim 12, wherein the transparent solid material fills the gap.

15. The display panel of claim 9, wherein the light emitting device comprises a sub-millimeter light emitting diode or a micrometer light emitting diode.

16. The display panel of claim 9, wherein each of the at least two display screens comprises a liquid crystal display screen or an LED direct-display display screen.

* * * * *